United States Patent [19]
Nishimura et al.

[11] Patent Number: 5,644,518
[45] Date of Patent: Jul. 1, 1997

[54] COMPUTING DEVICE FOR NTH DEGREE FUNCTIONS

[75] Inventors: Hiroyuki Nishimura, Kamakura, Japan; Toshiaki Yoshino, Fremont, Calif.

[73] Assignee: Texas Instruments Incorporated, Dallas, Tex.

[21] Appl. No.: 622,051

[22] Filed: Mar. 26, 1996

Related U.S. Application Data

[63] Continuation of Ser. No. 258,313, Jun. 10, 1994, abandoned.

[30] Foreign Application Priority Data

Jun. 10, 1993 [JP] Japan ................. 5-165191

[51] Int. Cl.$^6$ ................................................. G06F 17/11
[52] U.S. Cl. ................................................. 364/735
[58] Field of Search ........................... 364/735, 736, 364/715.01

[56] References Cited

U.S. PATENT DOCUMENTS

| | | | |
|---|---|---|---|
| 3,922,536 | 11/1975 | Hampel et al. | 364/735 |
| 3,967,100 | 6/1976 | Shimomura | 364/735 |
| 3,978,326 | 8/1976 | Shimomura | 364/735 |
| 5,060,181 | 10/1991 | Matsuoka | 364/735 |
| 5,235,535 | 8/1993 | Nakayama | 364/735 |
| 5,377,130 | 12/1994 | Frank et al. | 364/735 |

*Primary Examiner*—David H. Malzahn
*Attorney, Agent, or Firm*—William E. Hiller; Richard L. Donaldson

[57] ABSTRACT

An nth degree function computing device having a low-cost, small scale circuit in which no multipliers are present and which allows high-speed computing operations. The nth degree function computing device comprises two series operators 32 and 38 connected in series, with an adder 44 inserted between them, and with an adder 48 inserted between the output terminal of the second-stage series operator 38 and device output terminal 46. A constant $2a_2$ is sent from constant generator 50 to the first input terminal of an adder 34 of the first-stage series operator 32. A constant $(a_1-a_2)$ is sent from constant generator 52 to first input terminal of adder 44. A constant $a_0$ is sent from constant generator 54 to the first input terminal of adder 48. With respect to variable x (integer), a clock circuit 56 sends (x+1) synchronized clock pulses $CLK_i$ and x clock pulses $CLK_k$ to registers 36 and 42 of first-stage and second-stage series operators 32 and 38, respectively.

4 Claims, 3 Drawing Sheets

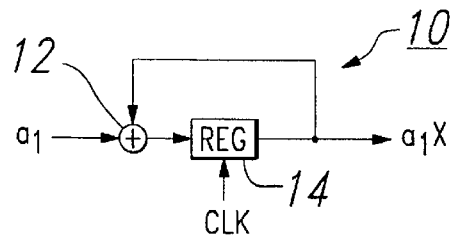
Fig. 1
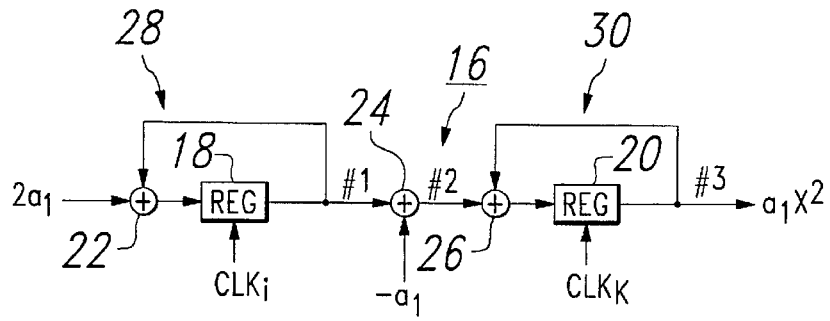
Fig. 2
| CLK$_i$ | #1 | #2 | CLK$_K$ | #3 |
|---|---|---|---|---|
| 1 | $2a_2$ | $a_2$ | | |
| 2 | $4a_2$ | $3a_2$ | 1 | $a_2$ |
| 3 | $6a_2$ | $5a_2$ | 2 | $4a_2$ |
| 4 | $8a_2$ | $7a_2$ | 3 | $9a_2$ |
| 5 | $10a_2$ | $9a_2$ | 4 | $16a_2$ |
| 6 | $12a_2$ | $11a_2$ | 5 | $25a_2$ |
Fig. 3
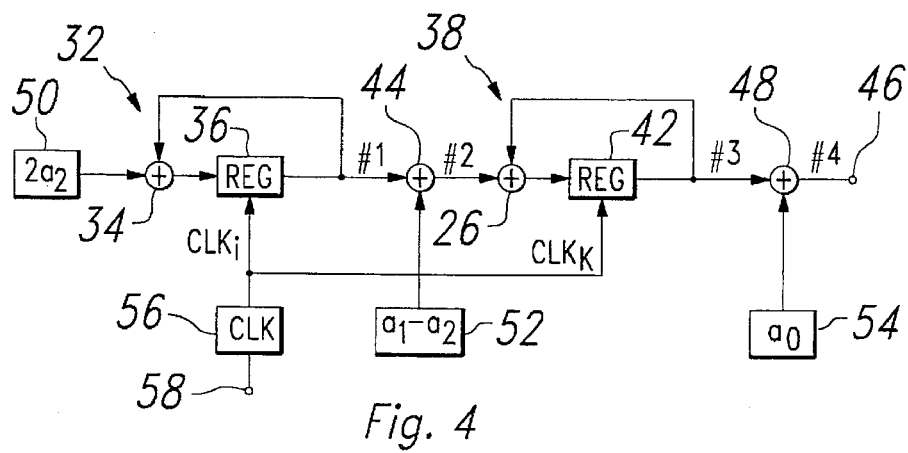
Fig. 4

| CLK$_i$ | #1 | #2 | CLK$_K$ | #3 | #4 |
|---|---|---|---|---|---|
| 1 | $2a_2$ | $a_1+a_2$ | | | |
| 2 | $4a_2$ | $a_1+3a_2$ | 1 | $a_1+a_2$ | $a_0+a_1+a_2$ |
| 3 | $6a_2$ | $a_1+5a_2$ | 2 | $2a_1+4a_2$ | $a_0+2a_1+4a_2$ |
| 4 | $8a_2$ | $a_1+7a_2$ | 3 | $3a_1+9a_2$ | $a_0+3a_1+9a_2$ |
| 5 | $10a_2$ | $a_1+9a_2$ | 4 | $4a_1+16a_2$ | $a_0+4a_1+16a_2$ |
| 6 | $12a_2$ | $a_1+11a_2$ | 5 | $5a_1+25a_2$ | $a_0+5a_1+25a_2$ |
| 7 | $14a_2$ | $a_1+13a_2$ | 6 | $6a_1+36a_2$ | $a_0+6a_1+36a_2$ |
*Fig. 5*
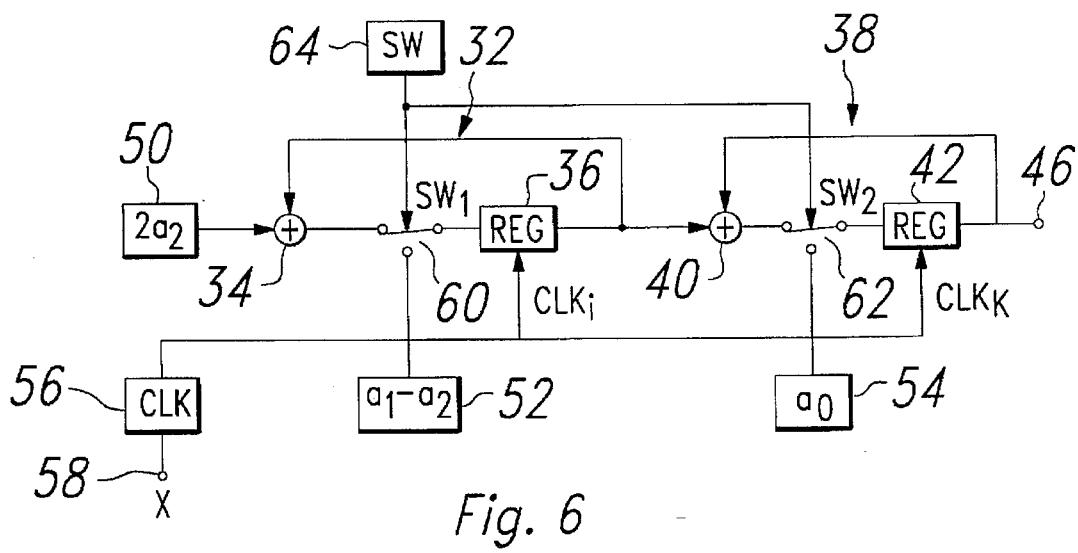
*Fig. 6*
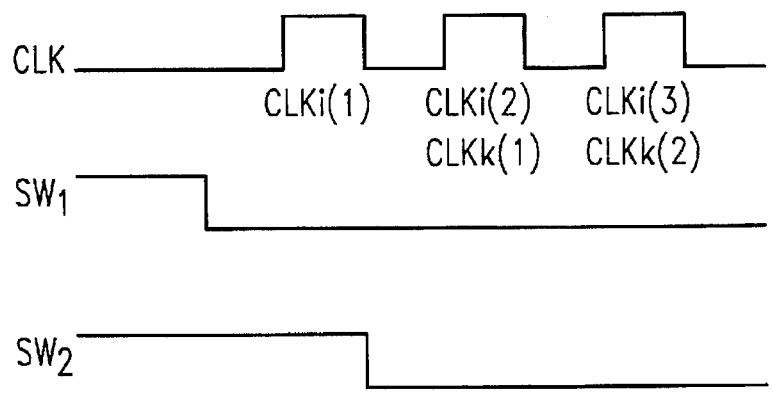
*Fig. 7*

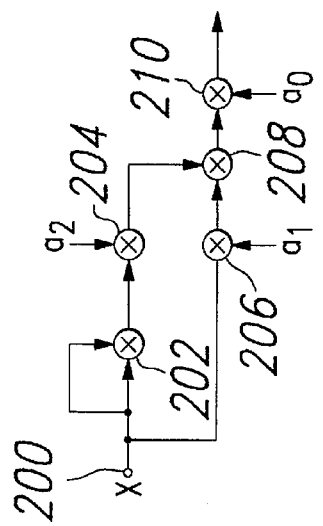
Fig. 10 PRIOR ART
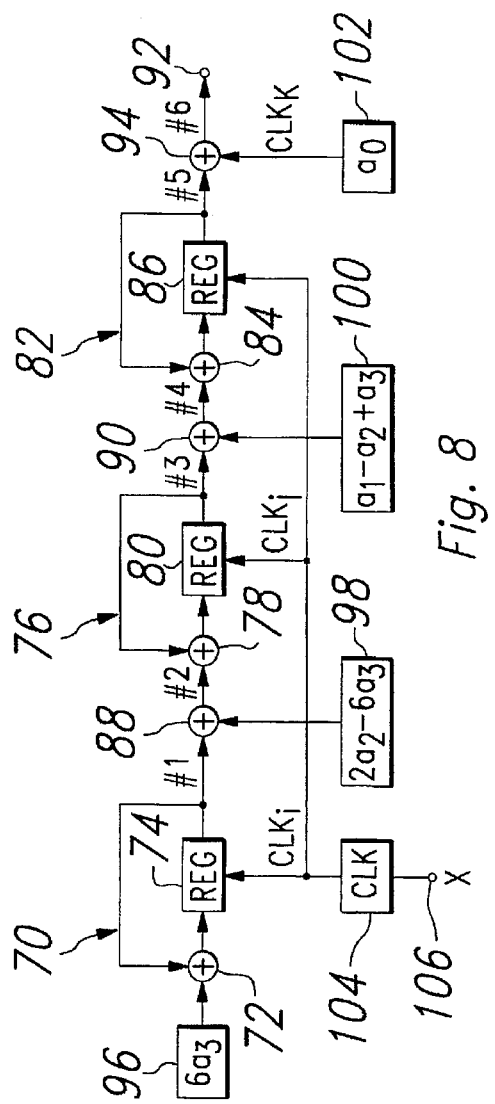
Fig. 8
Fig. 9

COMPUTING DEVICE FOR NTH DEGREE FUNCTIONS

This application is a continuation of application Ser. No. 08/258,313, filed Jun. 10, 1994, now abandoned.

This invention concerns a type of nth degree function computing device characterized by the fact that with an integer given for the variable, it computes the nth degree function.

BACKGROUND OF THE INVENTION

The nth degree function is usually represented as $f(x) = a_0 + a_1 \cdot x + a_2 \cdot x^2 + \ldots + a_n \cdot x^n$. In this formula, the zero degree term (the initial term) $a_0$ is a constant, the first degree term $a_1 \cdot x$ is a product of coefficient $a_1$ and variable x, the second degree item $a_2 \cdot x^2$ is a product of coefficient $a_2$ and the square of variable x, $x^2$, ..., and the nth degree term is a product of coefficient $a_n$ and the nth power of variable x, $x^n$. The nth degree function $f(x)$ is a sum of these n items.

As an example, FIG. 10 illustrates the circuit configuration of a conventional second degree function computing device for the second degree function $f(x) = a_0 + a_1 \cdot x + a_2 \cdot x^2$. This second degree function computing device is made up of three multipliers 202, 204, 206 and two adders 208, 210. The values of the coefficients of the various items, $a_2$, $a_1$, and $a_0$, are sent from coefficient generator (not shown in the figure) to one of the input terminals of multipliers 204, 206 and adder 210.

The value of variable x input to device input terminal 200 is sent to the two input terminals of multiplier 202 and the second input terminal of multiplier 204. At multiplier 204, multiplication is performed between $x^2$, fed from multiplier 202, and $a_2$, fed from coefficient generator, and the product $a_2 \cdot x^2$ is output. Output of multiplier 204, $a_2 \cdot x^2$ is fed to one input terminal of adder 208.

On the other hand, at multiplier 206, multiplication is performed between x, fed from device input terminal 200, and $a_1$, fed from the coefficient generator, and product $a_1 \cdot x$ is output. The output $a_1 \cdot x$ of multiplier 206 is sent to the second input terminal of adder 208. At adder 208, $a_2 \cdot x^2$ from multiplier 204 and $a_1 \cdot x$ from multiplier 206 are added, and the sum $(a_1 \cdot x + a_2 \cdot x^2)$ is output. The output of adder 208 $(a_1 \cdot x + a_2 \cdot x^2)$ is sent to the second input terminal of adder 210. At adder 210, $(a_1 \cdot x + a_2 \cdot x^2)$ from adder 208 and $a_0$ from the coefficient generator are added, and the sum $(a_0 + a_1 \cdot x + a_2 \cdot x^2)$ is output.

In this second degree function computing device, in the first cycle, multiplier 202 performs the multiplication $(x \times x)$; in the second cycle, multiplier 204 performs the multiplication $(a_2 \times x^2)$. In the first and second cycles, multiplier 206 performs multiplication $(a_1 \times x)$. In the third cycle, adder 208 performs addition $(a_1 \cdot x + a_2 \cdot x^2)$. In the fourth cycle, adder 210 performs addition $(a_0 + a_1 \cdot x + a_2 \cdot x^2)$. Consequently, for each variable, the total computing time is 4 cycles. Each time, when a variable x is input, the four-cycle computing operation is repeatedly carried out.

For the conventional nth degree function computing device, with respect to the value of input variable x, the values of the various terms, from the first degree term to the nth degree term of the nth degree function $f(x) = a_0 + a_1 \cdot x + a_2 \cdot x^2 + \ldots + a_n x^n$, $a_i \cdot x^i$, are computed by multipliers, and the sum of the values of the various terms $a_i \cdot x^i$ and its sum with the initial term $a_0$ are computed by adders in this circuit configuration. In this circuit configuration, there should be $n(n+1)/2$ multipliers. As a matter of fact, in the conventional second degree function computing device shown in FIG. 10, three multipliers 202, 204, 206 are used. However, the area occupied by a multiplier is much larger than that used by an adder, and the cost of the former is also much higher. Consequently, the conventional nth degree function computing device is a large circuit, and is very costly.

Also, for the conventional nth degree function computing device, each time a variable x is input, the computing operation starts from the initial (reset) state. Consequently, even in the case when the value of variable x is consecutively incremented, such as 10, 11, 12, ..., the operation time for one variable (4 cycles in the case of the second degree function) has to be repeated, and high-speed operation becomes impossible.

It is an object of the present invention to provide an nth degree function computing device having a low-cost, small scale circuit in which no multipliers are present, so that the computing operation can be performed at a high speed for the nth degree function when the value of variable x is consecutively incremented.

SUMMARY OF THE INVENTION

In accordance with the invention, an nth degree function computing device is provided, wherein an integer is taken as the variable and the nth degree function is computed. The nth degree function computing device comprises: n series operators connected in series, a constant generator in each of the series operators for generating the prescribed constant corresponding to one or several coefficients of the nth degree function, and a timing circuit in each of the series operators for performing the integration operation for a prescribed number of cycles corresponding to the value of the variable.

According to the invention, the output of the first-stage series operator is summed by the second-stage series operator; the output of the second-stage series operator is summed by the third-stage series operator, ... and the output of the (n–1) series operator is summed by the nth degree series operator. The constant input to each stage of series operators may be provided by the adder, or provided as data contained in the output of the preceding series operator.

Usually, a first clock pulse is initially sent to the first-stage series operator; then, the second clock pulse is sent to the first-stage series operator, while the first clock pulse is sent to the second-stage series operator; then, the third clock pulse and the second clock pulse are sent to the first-stage and second-stage series operators, respectively, while the first clock pulse is sent to the third-stage series operator under the timing control.

When a variable x (an integer) is input, the first-stage series operator performs the summing operation for only x+(n–1) cycles, the second stage series operator performs the summing operation for only x+(n–2) cycles, ... and the nth-stage series operator performs the summing operation for x cycles. At this time, the result of the operation for the nth degree function is obtained on the output side of the nth-stage series operator.

BRIEF DESCRIPTION OF THE DRAWINGS

FIG. 1 is a block diagram of a series operator circuit used in the invention.

FIG. 2 is a block diagram illustrating the computing device for the series computing operation for the second degree term of the nth degree function in accordance with the invention.

FIG. 3 is a table illustrating the values of data of the various parts when i clock pulses are sent to the computing device.

FIG. 4 is a block diagram illustrating the second degree function computing device in one embodiment of this invention.

FIG. 5 is a table illustrating the values of the data in the various parts when (x+1) and x clock pulses $CLK_j$ and $CLK_k$ are sent in synchronization to the first-stage and second-stage series operators, respectively, in the second degree function computing device shown in FIG. 4.

FIG. 6 is a block diagram illustrating the second degree function computing device in a modified example of the invention.

FIG. 7 is a timing diagram illustrating the timing of the switch control operation in the second degree function computing device of FIG. 5

FIG. 8 is a block diagram illustrating a third degree function computing device in an embodiment of this invention.

FIG. 9 is a table illustrating the data values at the various parts when (x+2), (x+1) and x clock pulses $CLK_i$, $CLK_j$, and $CLK_k$ are sent to the first-stage, second-stage, and third-stage series operators, respectively, in synchronization with each other, in the third degree function computing device shown in FIG. 8.

FIG. 10 is a block diagram illustrating a conventional second degree function computing device.

In reference numerals as shown in the drawings:
32, 74, first-stage series operator
38, 76, second-stage series operator
82, third-stage series operator
50, 52, 54, 96, 98, 100, 102, constant generator
56, 104, clock circuit

DESCRIPTION OF THE PREFERRED EMBODIMENTS

First of all, the basic method of the invention can be explained with reference to FIGS. 1–3. In an arithmetic series with an initial term of $b_0$ and with a difference of d, the sum of the initial term through the Nth term is $$\sum_{k=1}^{N} e_k = N[2b_0 + (N+1)d]/2 \; [sic; (N-1)d] \quad (1)$$

When difference d is 0, suppose the initial term b0 is $a_1$ (a constant), the following formula can be derived from said formula (1):

$$\sum_{k=1}^{N} a_1 \cdot N \quad (2)$$

In formula (2), when N (integer) is replaced by a variable x (integer), and the right-hand side is swapped with the left-hand side, the following formula is obtained:

$$a_1 \cdot x = \sum_{k=1}^{N} a_1 \quad (3)$$

That is, for the nth degree function of a variable x (an integer), $f(x)=a_0+a_1 \cdot x+a_2 \cdot x^2+ \ldots +a_n \cdot x^n$, the first degree term $a_1 \cdot x$ can be represented as a series of coefficients $a_1$ (k=1–x). From the viewpoint of the hardware, the multiplier for multiplying coefficient $a_1$ and variable x can be replaced by series operator 10 as shown in FIG. 1.

As can be seen from FIG. 1, this series operator 10 is made up of one adder 12 and one register 14. Constant $a_1$, which is equal to coefficient $a_1$, is sent from a constant generator to first input terminal of adder 12. The output terminal of adder 12 is connected to the input terminal of register 14, and the output terminal of register 14 is connected to the second input terminal of adder 12. Clock CLK is sent from a clock circuit (not shown in the figure) to register 14.

The operation of the series operator 10 is as follows. In the reset state, the output of adder 12 is $a_1$, and the content and output of register 14 are 0. First of all, as the first clock pulse CLK is sent to register 14, output $a_1$ of adder 12 is loaded into register 14, and the output of register 14 becomes $a_1$. Output $a_1$ of register 14 is sent to the second input terminal of adder 12. Adder 12 adds the two inputs $a_1$ and $a_1$, and outputs their sum $2a_1$. When the second clock pulse CLK is sent to register 14, output $2a_1$ of adder 12 is loaded into register 14, and the output of register 14 is renewed to $2a_1$. Immediately after that, the output of adder 12 becomes $3a_1$. In this way, when N clock pulses CLK are sent to register 14, the output of register 14 becomes $N \cdot a_1$.

Consequently, when clock pulses CLK of a number equal to the value of variable x (an integer) have been sent in, and series operator 10 performs x cycles of the summing operation, the result of the operation of $a_1 \cdot x$ as the first degree term of the nth degree function f(x) can be obtained.

In formula (1), suppose the difference d=1 and the initial term is 0, the following formula can be obtained:

$$\sum_{k=1}^{N} k = N \cdot (N+1)/2 \quad (4)$$

In formula (4), when N (integer) is replaced by variable x (integer), it becomes $$\sum_{k=1}^{x} k = x \cdot (x+1)/2 \quad (5)$$

Formula (5) can be manipulated to the following formula:

$$\begin{aligned}
x^2 &= 2 \sum_{k=1}^{x} k - x \quad (6) \\
&= \sum_{k=1}^{x} 2k - x \\
&= \sum_{k=1}^{x} \left( \sum_{i=1}^{k} 2 \right) - \sum_{k=1}^{n} 1 \\
&= \sum_{k=1}^{x} \left[ \left( \sum_{i=1}^{k} 2 \right) - 1 \right]
\end{aligned}$$

When both the left-hand side and the right-hand side of formula (6) are multiplied by coefficient $a_2$, the following formula can be obtained:

$$\begin{aligned}
a_2 x^2 &= a_2 \sum_{k=1}^{x} \left[ \left( \sum_{i=1}^{k} 2 \right) - 1 \right] \quad (7) \\
&= \sum_{k=1}^{x} \left[ \left( \sum_{i=1}^{k} 2a_2 \right) - a_2 \right]
\end{aligned}$$

That is, when variable x is an integer, the secondary term $a_2 \cdot x^2$ of the nth degree function $f(x)=a_0+a_1 \cdot x+a_2 \cdot x^2+ \ldots +a_n \cdot x^n$ can be represented by the series on the right-hand side of formula (7). The right-hand series of formula (7) can be realized by using a computing circuit 16 as shown in FIG. 2.

As shown in FIG. 2, the computing circuit 16 comprises two registers 18, 20, and three adders 22, 24, 26. Adder 22 and register 18 form first-stage series operator 28, and adder 26 and register 20 form second-stage series operator 30. The first-stage series operator 28 and second-stage series operator 30 are connected to each other in series through adder 24. Constants $2a_2$ and $-a_2$ corresponding to coefficient $a_2$ are sent from constant generator (not shown in the figure) to first input terminals of adders 22 and 24, respectively. Clock signals $CLK_i$ and $CLK_k$, synchronized by means of a clock circuit (not shown in the figure) are sent from a clock circuit (not shown in the figure) to the two registers 18 and 20, respectively.

The operation of the computing circuit 16 can be explained with reference to the table shown in FIG. 3. In the reset state, output #1 from first-stage series operator 28 is 0, output #2 from adder 24 is 0, and output #3 from second-stage series operator 30 is 0. In first-stage series operator 28, the output of adder 22 is $2a_2$.

First of all, in first-stage series operator 28, when first clock pulse $CLK_i$ is sent to register 18, output $2a_2$ of adder 22 is loaded in register 18, and the output of register 18 becomes ($2a_2$). Output $2a_2$ of register 18 is sent to adders 22 and 24. Adder 22 adds the two inputs $2a_2$ and $2a_2$, and outputs the sum, $4a_2$. Adder adds two inputs $2a_2$ and $-a_2$ and outputs the sum, $a_2$. Output $a_2$ of adder 24 is sent to adder 26 of second-stage series operator 30, and the output of adder 26 becomes $a_2$.

Then, in first-stage series operator 28, as the second clock pulse $CLK_i$ is sent to register 18, output $4a_2$ of adder 22 is loaded into register 18, the output of register 18 becomes $4a_2$. Immediately after that, the output of adder 22 becomes $6a_2$ ($4a_2+2a_2$). The output of register 18 becomes $4a_2$, and the output of adder 24 becomes $3a_2$. On the other hand, as the first clock pulse $CLK_k$ is sent to register 20 in second-stage series operator 30, output $a_2$ of adder 26 is loaded in register 20, the output of register 20 becomes $a_2$. Immediately after that, the output of adder 26 becomes $4a_2$ ($3a_2+a_2$).

Then, in first-stage series operator 28, while the third clock pulse $CLK_i$ is sent to register 18, the second clock pulse $CLK_k$ is sent to register 20 in second-stage series operator 30, and the various parts perform the same operation as above. In this way, the output of register 18 becomes $6a_2$; the output of adder 22 becomes $8a_2$ ($6a_2+2a_2$); the output of adder 24 becomes $5a_2$; the output of register 20 becomes $4a_2$; and the output of adder 26 becomes $9a_2$ ($5a_2+4a_2$). In the following operation, each time clock pulses $CLK_i$ and $CLK_k$ are sent to registers 18 and 20, the same operation as above is repeated, and the data shown in FIG. 3 are obtained. As the output of register 20, that is, for output #3 of second-stage series operator 30, at the time clock pulses $CLK_k$ are sent with a number corresponding to the value of variable x, a computed result of $a_2 \cdot x^2$ can be obtained.

In this way, in computing device 16 shown in FIG. 2, when clock pulses $CLK_i$ are sent in for (x+1) cycles, that is, one more than the value of variable x, the summing operation is performed for (x+1) cycles in first-stage series operator 28, and, in synchronization to this, x clock pulses $CLK_k$, where x is the value of the variable, are sent to register 20, and second-stage series operator 30 performs x cycles of integral operation, and the computed result of second degree term $a_2 \cdot x^2$ Of the nth degree function f(x) is obtained. Consequently, in the case of incrementing of variable x by 1 each step, one clock pulse $CLK_i$ and one clock pulse $CLK_k$ are sent to registers 18,20, respectively, in accordance with the increment. As shown in FIG. 3, the computed result of $a_2 \cdot x^2$ with respect to each variable value x can be obtained in one cycle period.

In the following, the nth degree function computing device of this invention for computing the various terms of the nth degree function $f(x)=a_0+a_1 \cdot x+a_2 \cdot x^2+ \ldots +a_n \cdot x^n$ at the same time will be explained. First of all, the second-stage series operator in this invention will be explained. According to the formulas (3) and (7), the second degree function $f(x)=a_0+a_1 \cdot x+a_2 \cdot x^2$ can be modified to the following formula:

$$f(x) = a_0 + \sum_{k=1}^{x} a_1 + \sum_{k=1}^{x} \left[ \left( \sum_{i=1}^{k} 2a_2 \right) - a_2 \right] \qquad (8)$$

$$= a_0 + \sum_{k=1}^{x} \left[ \left( \sum_{i=1}^{k} 2a_2 \right) + (a_1 - a_2) \right]$$

FIG. 4 is a diagram illustrating the second degree function computing device in an embodiment of this invention which computes the right side of the value formula (8). The second degree function computing device has two series operators 32,38 connected to each other in series. First-stage series operator 32 is made up of one adder 34 and one register 36, and second-stage series operator 38 is made up of one adder 40 and one register 42. Adder 44 is placed between the two series operators 32 and 38. Adder 48 is inserted between the output terminal of second-stage series operator 38 and device output terminal 46.

Constant $2a_2$ corresponding to coefficient $a_2$ of the second degree term of second degree function f(x) is sent from constant generator 50 to first input terminal of adder 34 of first-stage series operator 32. Constant $(a_1-a_2)$ corresponding to coefficient $a_1$ of the first degree term and coefficient $a_2$ of the second degree term of second degree function f(x) is sent from constant generator 52 to first input terminal of adder 44. Constant $a_0$ corresponding to coefficient $a_0$ of the zero degree term (the initial term) of second degree function f(x) is sent from constant generator 54 to first input terminal of adder 48. One clock pulse $CLK_i$ more than the value of variable x (an integer) is sent from clock circuit 56 to register 36 of first-stage series operator 32. One clock pulse $CLK_k$ more than the value of variable x (an integer) is sent from clock circuit 56 to register 42 of second-stage series operator 38. As variable x (integer) is input from input terminal 58 to clock circuit 56, at first only one clock pulse $CLK_i$ is sent to register 36; the two clock signals $CLK_i$ and $CLK_k$ are synchronized, and x pulses are sent to two registers 36 and 42, respectively.

In this second degree function computing device, the same operation as performed by computing device 16 of FIG. 2 is performed in the first-stage and second-stage series operators 32 and 38 connected to each other in series for computation of second degree term $a_2 \cdot x^2$. For first degree term $a_1 \cdot x$, as the coefficient $a_1$ of the first degree term is contained in constant ($a_1-a_2$) given to adder 44 from constant generator 52, in second-stage series operator 38, the same operation is performed as in first-stage series operator 10. For initial term $a_0$, a constant $a_0$ is sent from constant generator 54 in adder 48 arranged at the output side of second-stage series operator 38.

As shown in FIG. 5, in the second degree function computing device, at the time when (x+1) clock pulses $CLK_i$ and x clock pulses $CLK_k$ are sent with respect to variable x (integer), the output of register 36 becomes #1; the output of adder 44 becomes #2; the output of register 42 becomes #3; and the output of adder 48 becomes #4. These are the data values obtained, respectively. As far as output #4 of adder 48 is concerned, that is, the data obtained at device output terminal 46, when x clock pulses $CLK_k$ are sent, where x is the variable value, the computed result of second degree function of variable x, that is, $f(x)=a_0+a_1 \cdot x+a_2 \cdot x^2$, is obtained.

In the second degree function computing device in this embodiment, when (x+1) clock pulses $CLK_i$, that is one larger value than the variable value x, are sent to register 36, only (x+1) cycles of summing operation are performed in first-stage series operator 32, and, in synchronization with it, x clock pulses $CLK_k$ corresponding to variable x are sent to register 42, and x cycles of summing operation are performed for second-stage series operator 38. As a result, the computed result of second degree function $f(X)=a_0+a_1\cdot x+a_2\cdot x^2$ is obtained. Consequently, when variable x is incremented by one, corresponding to the increment, clock pulses $CLK_i$ and $CLK_k$ are sent to registers 36 and 42, respectively, one at a time. As shown in FIG. 5, in one clock cycle, the computed result of the second degree function $f(x)=a_0+a_1\cdot x+a_2\cdot x^2$ can be obtained.

FIG. 6 illustrates a modified example of the second degree function computing device shown in FIG. 4. In this modified example, adders 44 and 48 contained in the computing device shown in FIG. 4 are deleted. In place of the adders 44 and 48, switches 60 and 62 are arranged in first-stage and second-stage series operators 32 and 38. In first-stage series operator 32, the first input terminal of switch 60 is connected to the output terminal of adder 34, the second input terminal is connected to the output terminal of constant generator 52, and the output terminal is connected to the input terminal of register 36. In second-stage series operator 38, the first input terminal of switch 62 is connected to the output terminal of adder 40, the second input terminal is connected to the output terminal of constant generator 54, and the output terminal is connected to the input terminal of register 42. Two switches 60 and 62 are controlled by switch control signals $SW_1$ and $SW_2$ from switch control circuit 64.

FIG. 7 illustrates the timing relationship between clocks $CLK_i$, $CLK_k$ and switch control signals $SW_1$, $SW_2$. In the reset state, switch control signals $SW_1$ and $SW_2$ are on H level, switches 60 and 62 are turned to the side of constant generators 52 and 54, and constants ($a_1-a_2$) and $a_0$ are contained as the initial values in registers 36 and 42, respectively.

Immediately before output of the first clock pulse $CLK_i$ (1) from clock circuit 56, switch control signal $SW_1$ is changed from H level to L level, and switch 60 is turned to the side of adder 34. In this way, the first clock pulse $CLK_i$ is sent to register 36, output $2a_2$ of adder 34 is loaded in register 36; hence, the content of register 36 becomes ($a_1+a_2$), and output ($a_1+a_2$) of this register 36 is sent to adder 40 of second-stage series operator 38.

Then, right before the output of clocks $CLK_i$ and $CLK_k$ from clock circuit 56, switch control signal $SW_2$ is changed from H level to L level, and switch 62 is turned to the side of adder 40. In this way, while the second clock pulse $CLK_i(2)$ is sent to register 36, the first clock pulse $CLK_k(1)$ is sent to register 42, the content and output of register 36 become ($a_1+3a_2$), and the content of register 42 becomes ($a_0+a_1+a_2$). Then, the third clock pulse $CLK_i$ 3 is sent to register 36 and the second clock pulse $CLK_k$ is simultaneously sent to register 42, the content and output of register 36 become ($a_1+5a_2$), and the content and output of register 42 become ($a_0+2a_1+4a_2$).

In this way, in the second degree function computing device of FIG. 6, at the output of first-stage series operator 32, the same computed value is obtained as the output of adder 44 in the second degree function computing device in FIG. 4, and at the output of second-stage series operator 38, the same computed value is obtained as the output of adder 48 in the second degree function computing device in FIG. 4.

In the following, the third degree function computing device of the invention will be explained. According to the invention, the third degree function $f(x)=a_0+a_1\cdot x+a_2\cdot x^2+a_3\cdot a^3$ can be defined as follows:

$$f(x) = a_0 + \sum_{k=1}^{x} a_1 + \sum_{k=1}^{x}\left[\left(\sum_{j=1}^{k} 2a_2\right)-a_2\right] + \quad (9)$$

$$\sum_{k=1}^{x}\left\{\sum_{j=1}^{k}\left[\left(\sum_{i=1}^{j} 6a_3\right)-6a_3\right]+a_3\right\}$$

$$= a_0 + \sum_{k=1}^{x}\left\{\sum_{j=1}^{k}\left[\left(\sum_{i=1}^{j} 6a_3\right)+\right.\right.$$

$$\left.\left.(2a_2-6a_3)\right] + (a_1-a_2+a_3)\right\}.$$

FIG. 8 illustrates a third degree function computing device in an embodiment of the invention for computing the right-hand side of formula (9). This third degree function computing device has three series operators 70, 76, 82 connected in series. First-stage series operator 70 is made up of one adder 72 and one register 74; second-stage series operator 76 is made up of one adder 78 and one register 80; and third-stage series operator 82 is made up of one adder 84 and one register 86. An adder 88 is inserted between first-stage series operator 70 and second-stage series operator 76; an adder 90 is inserted between second-stage series operator 76 and third-stage series operator 82; and an adder 94 is inserted between the output terminal of third-stage series operator 82 and device output terminal 92.

Constant $6a_3$ corresponding to the coefficient $a_3$ of the third degree term of third degree function f(x) is sent from constant generator 96 to the first input terminal of adder 72 of first-stage series operator 70. Constant ($2a_2-6a_3$) corresponding to the coefficients $a_2$ and $a_3$ of the second degree and third degree terms of the third degree function f(x) is sent from constant generator 98 to first input terminal of adder 88. Constant ($a_1-a_2+a_3$) corresponding to the coefficients $a_1$, $a_2$ and $a_3$ of the first degree, second degree and third degree terms of the third degree function f(x) is sent from constant generator 100 to the first input terminal of adder 90. Constant $a_0$ corresponding to the zero degree term (the initial term) $a_0$ of the third degree function f(x) is sent from constant generator 102 to first input terminal of adder 94.

Clock pulses $CLK_i$, in a number larger by two than the value of variable x (an integer), are sent from clock circuit 104 to register 74 of first-stage series operator 70. Clock pulses $CLK_j$, in a number larger by one than the value of variable x (an integer), are sent from clock circuit 104 to register 80 of second-stage series operator 76. Clock pulses $CLK_k$, in a number equal to the value of variable x (an integer), are sent from clock circuit 104 to register 86 of third-stage series operator 82. As variable x (integer) is input from input terminal 106 to clock circuit 104, at first, the first clock pulse $CLK_i$ is sent to register 74; then, the second clock pulse $CLK_i$ and the first clock pulse $CLK_j$ are synchronized and sent to registers 74, 80; then, the third clock pulse $CLK_i$, the second clock pulse $CLK_j$, and the first clock pulse $CLK_k$ are synchronized and are sent to registers 74, 80, and 86. Then, in synchronization with each other, clock pulses $CLK_i$, $CLK_j$, and $CLK_k$ are sent to registers 74, 80, 86, respectively, each for (x–1) cycles.

As shown in FIG. 9, in the third degree function computing device, at the time point when (x+2) clock pulses $CLK_i$, (x+1) clock pulses $CLK_j$, and x clock pulses $CLK_k$ based on variable x have been sent to registers 74,80,86, output #1 of register 74, output #2 of adder 88, output #3 of register 80, output #4 of adder 90, output #5 of register 86, and output #6 of adder 94 can be obtained, respectively.

At first-stage series operator 70, corresponding to clock pulse $CLK_i$, constant $6a_3$ from constant generator 96 is summed, and the computed value of $$\sum_{i=1}^{j} 6a_3$$

is obtained at the output of register 74. Adder 88 adds constant $(2a_2-6a_3)$ to output #1 of register 74, and a computed value of $$\left\{ \left( \sum_{i=1}^{j} 6a_3 \right) + (2a_2 - 6a_3) \right\}$$

is obtained at output #2.

In second-stage series operator 76, corresponding to clock pulse $CLK_j$, $$\left\{ \left( \sum_{i=1}^{j} 6a_3 \right) + (2a_2 - 6a_3) \right\}$$

is summed at output #2 of adder 88, and the computed value of $$\sum_{j=1}^{k} \left[ \sum_{i=1}^{j} 6a_3) - (2a_2 - 6a_3) \right]$$

is obtained at the output #3 of register 80. Adder 90 adds constant $(a_1-a_2+a_3)$ to output #3 of register 80, and a computed value of $$\sum_{j=1}^{k} \left[ \sum_{i=1}^{j} 6a_3) + (2a_2 - 6a_3) \right] + (a_1 - a_2 + a_3)$$

is obtained at its output #4.

In third-stage series operator 82, corresponding to clock pulse $CLK_k$, $$\sum_{j=1}^{k} \left[ \left( \sum_{i=1}^{j} 6a_3 \right) + (2a_2 - 6a_3) \right] + (a_1 - a_2 + a_3)$$

is summed at output #4 of adder 90 and the computed value of $$\sum_{k=1}^{x} \left\{ \sum_{j=1}^{k} \left[ \left( \sum_{i=1}^{j} 6a_3 \right) + (2a_2 - 6a_3) \right] + (a_1 - a_2 + a_3) \right\}$$

is obtained at the output #5 of register 86. Adder 94 adds constant $a_0$ to output #5 of register 86, and a computed value as shown in the right-hand side of formula 9 is obtained at its output #6. As shown in FIG. 9, as far as the data obtained at output #6 of adder 94 are concerned, that is, device output terminal 92, when x clock pulses $CLK_k$, where x is the variable, are sent, the computed result of the third function $f(x)=a_0+a_1 \cdot x+a_2 \cdot x^2+a_3 \cdot x^3$ can be obtained based on x.

In this way, in the third degree function computing device of this embodiment, when second-stage (x+2) clock pulses $CLK_i$ and first-stage (x+1) clock pulses $CLK_j$, where x is the variable value, are sent to registers 74 and 80, respectively, (x+2) and (x+1) cycles of summing operation are performed in first-stage and second-stage series operators 70 and 76, respectively, and, in synchronization to this operation, x clock pulses $CLK_k$ corresponding to variable x are sent to register 86, and x cycles of summing operation are performed at third-stage series operator 82. As a result, the computed result of third degree function $f(x) = a_0+a_1 \cdot x+a_2 \cdot x^2+a_3 \cdot x^3$ is obtained. Consequently, when variable x is incremented by one, corresponding to the increment, clock pulses $CLK_i$, $CLK_j$ and $CLK_k$ are sent to registers 74, 80, 86, respectively, one at a time. As shown in FIG. 9, in one clock cycle, the computed result of the third degree function $f(x)=a_0+a_1 \cdot x+a_2 \cdot x^2+a_3 \cdot x^3$ can be obtained with respect to variable x.

Just as in the aforementioned case of the second degree function computing device, for this third degree function computing device, too, it is possible to delete adders 88, 90, 94 between the various series operators. Also, for the fourth or higher nth degree function, based on the same principle as explained above, an nth degree function computing device in accordance with the invention can be built.

In accordance with the invention, n stages of series operators are connected in series, and a constant generator is used to generate the prescribed constants corresponding to one or several coefficients of the nth degree function in the series operators of various stages. The summing operation is then performed for cycles with a prescribed number corresponding to the value of the variable in the various sections of the series operators to give the computed result of the nth degree function. Consequently, there is no need to use multipliers, the circuit size is small, and the cost is lower for the nth degree function computing device. Also, for the nth degree function computing device of the invention, when the variable is incremented, the computed results of the nth degree function can be output successively in the clock period. This is a desired function.

We claim:

1. An nth degree function computing device comprising:
   n series operators connected in series and defining respective consecutive series operator stages;
   a plurality of operator stage summing adders respectively alternating with said n series operators such that an operator stage summing adder is connected between successive series operators;
   each of said series operators including
   a shift register having an input and an output,
   an adder having first and second inputs and an output, the output of said adder being connected to the input of said shift register, and
   a feedback line connected between the output of said shift register and the second input of said adder;
   each of said operator stage summing adders having first and second inputs and an output, the second input of each operator stage summing adder being connected to the output of the shift register included in a downstream series operator and the output of each operator stage summing adder being connected to the second input of an adder included in a succeeding upstream series operator in relation to the downstream series operator;
   a plurality of constant generators respectively corresponding to a specific one of said n series operators;
   the initial one of said constant generators being connected to the first input of the adder included in the said n series operator defining the initial series operator stage;
   each of the remaining constant generators being connected to the first input of respective operator stage summing adders in advance of the one of said n series operators corresponding thereto, said plurality of constant generators respectively providing a predetermined constant value to the first input of the adder connected thereto corresponding to one or a plurality of coefficients of the nth degree function; and
   a timing circuit connected to the shift register included in each of said n series operators and providing respective timing signals regulating the performance of an integration operation by each of said n series operators for a predetermined number of cycles dependent upon the value of a variable integer operated upon by each respective series operator;

such that the output of an initial stage series operator is received by the second input of an operator stage summing adder as a predetermined constant value is input to the first input of the operator stage summing adder by the constant generator corresponding thereto, thereby summing the output of an initial stage series operator by the succeeding second stage series operator, the output of said second stage series operator being summed by the third stage series operator and the output of the (n−1) series operator being summed by the nth series operator.

2. An nth degree function computing device as set forth in claim 1, wherein the initial one of said constant generators provides a constant $2a_2$ corresponding to a coefficient $a_2$ of a second degree term of a second degree function f(x) to the first input of the adder included in the said n series operator defining the initial series operator stage;

the next successive constant generator providing a constant $(a_1{-}a_2)$ corresponding to a coefficient $a_1$ of a first degree term and the coefficient $a_2$ of the second degree term of the second degree function f(x) to the first input of said operator stage summing adder connected between the initial series operator stage and the succeeding series operator stage; and the next successive constant generator providing a constant $a_0$ corresponding to a coefficient $a_0$ of a zero degree term of the second degree function f(x) to the first input of an operator stage summing adder connected to the output of said succeeding series operator stage at the second input thereof; and the output of the last-mentioned operator stage summing adder producing the computed result of the second degree function f(x).

3. An nth degree function computing device as set forth in claim 1, wherein the initial one of said constant generators provides a constant $6a_3$ corresponding to a coefficient $a_3$ of a third degree term of a third degree function f(x) to the first input of the adder included in the said R series operator defining the initial series operator stage;

the next successive constant operator providing a constant $(2a_2{-}6a_3)$ corresponding to a coefficient $a_2$ of a second degree term and the coefficient $a_3$ of the third degree term of the third degree function f(x) to the first input of said operator stage summing adder connected between the initial series operator stage and the succeeding series operator stage;

the next successive constant generator providing a constant $(a_1{-}a_2{+}a_3)$ corresponding to the coefficients $a_1$, $a_2$ and $a_3$ of the first, second, and third degree terms of the third degree function f(x) to the first input of an operator stage summing adder connected to the output of said succeeding series operator stage at the second input thereof;

the next successive constant generator providing a constant $a_0$ corresponding to a coefficient $a_0$ of a 0 degree term of the third degree function f(x) to the first input of an operator stage summing adder connected to the output of the succeeding series operator stage at the second input thereof; and the output of the last-mentioned operator stage summing adder producing the computed result of the third degree function f(x).

4. An nth degree function computing device comprising:

n series operators connected in series and defining respective consecutive series operator stages;

each of said series operators including
 a shift register having an input and an output,
 an adder having first and second inputs and an output, the output of said adder being connected to the input of said shift register, and
 a feedback line connected between the output of said shift register and the second input of said adder;

a plurality of switches having input and output terminals respectively arranged in each of said series operators so as to be connected between the adder and the shift register thereof such that the output of the adder is connected to the input terminal of the corresponding switch and the output terminal of the corresponding switch is connected to an input of the shift register;

a switch control circuit connected to each of said plurality of switches and providing switch control signals for each of said switches to control the switch between first and second states thereof;

a plurality of constant generators respectively corresponding to a specific one of said n series operators;

the initial one of said constant generators being connected to the first input of the adder included in the said n series operator defining the initial series operator stage and providing a constant $2a_2$ corresponding to a coefficient $a_2$ of a second degree term of a second degree function f(x) to the first input of the adder included in the said n series operator defining the initial series operator stage;

each of the remaining constant generators being connected to a respective switch corresponding to a specific one of said n series operators and providing a predetermined constant value to the input of the shift register of the said one series operator when the switch is in the first state;

the next successive constant generator after the initial constant generator providing a constant $(a_1{-}a_2)$ corresponding to a coefficient $a_1$ of a first degree term and the coefficient $a_2$ of the second degree term of the second degree function f(x) to the switch connected in the initial series operator stage;

the next successive constant generator being connected to the switch located in the succeeding series operator stage and providing a constant $a_0$ corresponding to a coefficient $a_0$ of a 0 degree term of the second degree function f(x) to the switch included in the succeeding series operator stage;

said plurality of switches alternately connecting the respective constant generators corresponding thereto to the input of a shift register included in a series operator in the first switch state and connecting the output of the adder to the input of the shift register included in the respective series operator in the second switch state;

a timing circuit connected to the shift register included in each of said n series operators and providing respective timing signals regulating the performance of an integration operation by each of said n series operators for a predetermined number of cycles dependent upon the value of a variable integer operated upon by each respective series operator; and the output of the final series operator stage included in the consecutive series operator stages producing the computer result of the second degree function f(x).

* * * * *